United States Patent [19]

Sawicki et al.

[11] Patent Number: 5,667,198
[45] Date of Patent: Sep. 16, 1997

[54] GATE VALVE FOR CONTROLLING THE FLOW OF VISCOUS LIQUIDS

[75] Inventors: Alexander Robert Sawicki, Pittstown; Edward R. Webb, Metuchen, both of N.J.

[73] Assignee: L. A. Dreyfus Company, Inc., Edison, N.J.

[21] Appl. No.: 477,988

[22] Filed: Jun. 7, 1995

[51] Int. Cl.$^6$ ............................................. F16K 1/16
[52] U.S. Cl. .................... 251/300; 251/301; 251/93; 251/203
[58] Field of Search .......................... 251/300, 303, 251/301, 90, 93, 333, 203

[56] References Cited

U.S. PATENT DOCUMENTS

| | | | |
|---|---|---|---|
| 20,853 | 7/1858 | Whittelsey | 251/300 |
| 606,025 | 6/1898 | Perry | 251/300 |
| 867,303 | 10/1907 | Robertson | 251/300 |
| 895,697 | 8/1908 | Snow | 251/300 |
| 1,238,944 | 9/1917 | Rogers et al. | 251/301 |
| 1,619,956 | 3/1927 | Renehan | 137/583 |
| 1,656,280 | 1/1928 | Lalor | 251/302 |
| 2,289,645 | 7/1942 | Geistert | 251/300 |
| 2,498,396 | 6/1950 | Cunningham | 251/301 |
| 2,657,007 | 10/1953 | Ganz | 251/90 |
| 3,000,608 | 9/1961 | Williams | 251/170 |
| 3,045,706 | 7/1962 | Dillon | 251/301 |
| 3,194,529 | 7/1965 | Brock | 251/90 |
| 3,333,816 | 8/1967 | Williams et al. | 381/180 |
| 3,700,208 | 10/1972 | Hanan | 251/90 |
| 3,910,554 | 10/1975 | Speedie | 251/303 |
| 4,060,096 | 11/1977 | Schade | 251/303 |
| 4,353,524 | 10/1982 | Spendlow, Sr. et al. | 251/145 |
| 4,483,206 | 11/1984 | Thompson | 251/300 |
| 4,512,547 | 4/1985 | Balch | 251/301 |
| 4,860,786 | 8/1989 | Pollard | 251/90 |
| 4,889,166 | 12/1989 | Lakatos | 251/300 |

FOREIGN PATENT DOCUMENTS

| | | | |
|---|---|---|---|
| 1276813 | 12/1960 | France | 251/300 |
| 542637 | 4/1956 | Italy . | |

Primary Examiner—Denise L. Ferensic
Assistant Examiner—Joanne Y. Kim
Attorney, Agent, or Firm—Brinks Hofer Gilson & Lione

[57] ABSTRACT

A pivoting gate valve assembly includes a seat plate with an orifice therethrough, a stop plate and a gate. The stop plate is mounted on the seat plate and borders a portion of the orifice. The gate is pivotably mounted to the seat plate and pivots to a closed position against the stop plate and covering the orifice. The gate and the stop plate form a substantially flush contiguous surface when in the closed position.

10 Claims, 4 Drawing Sheets

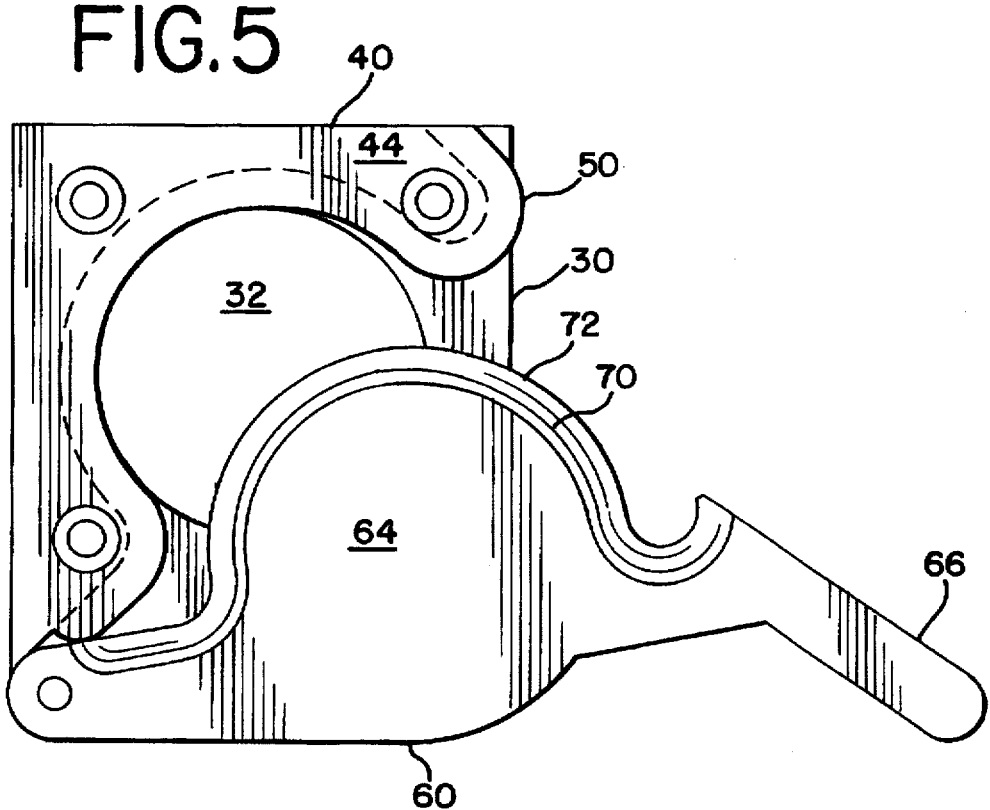
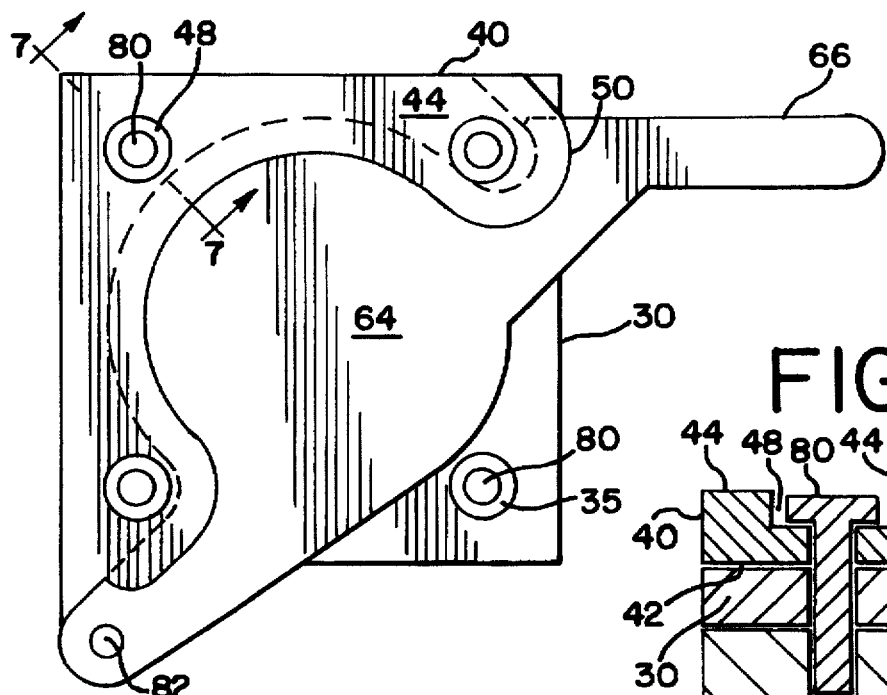
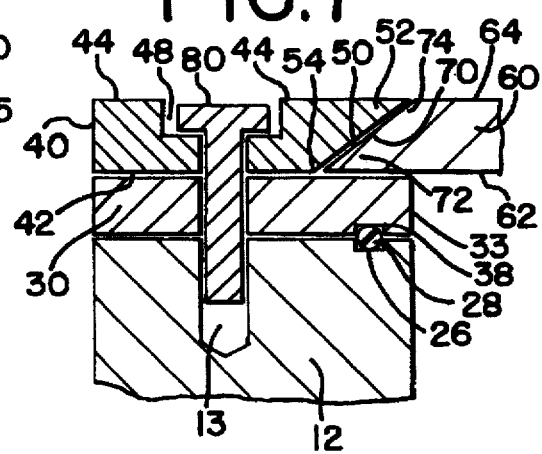

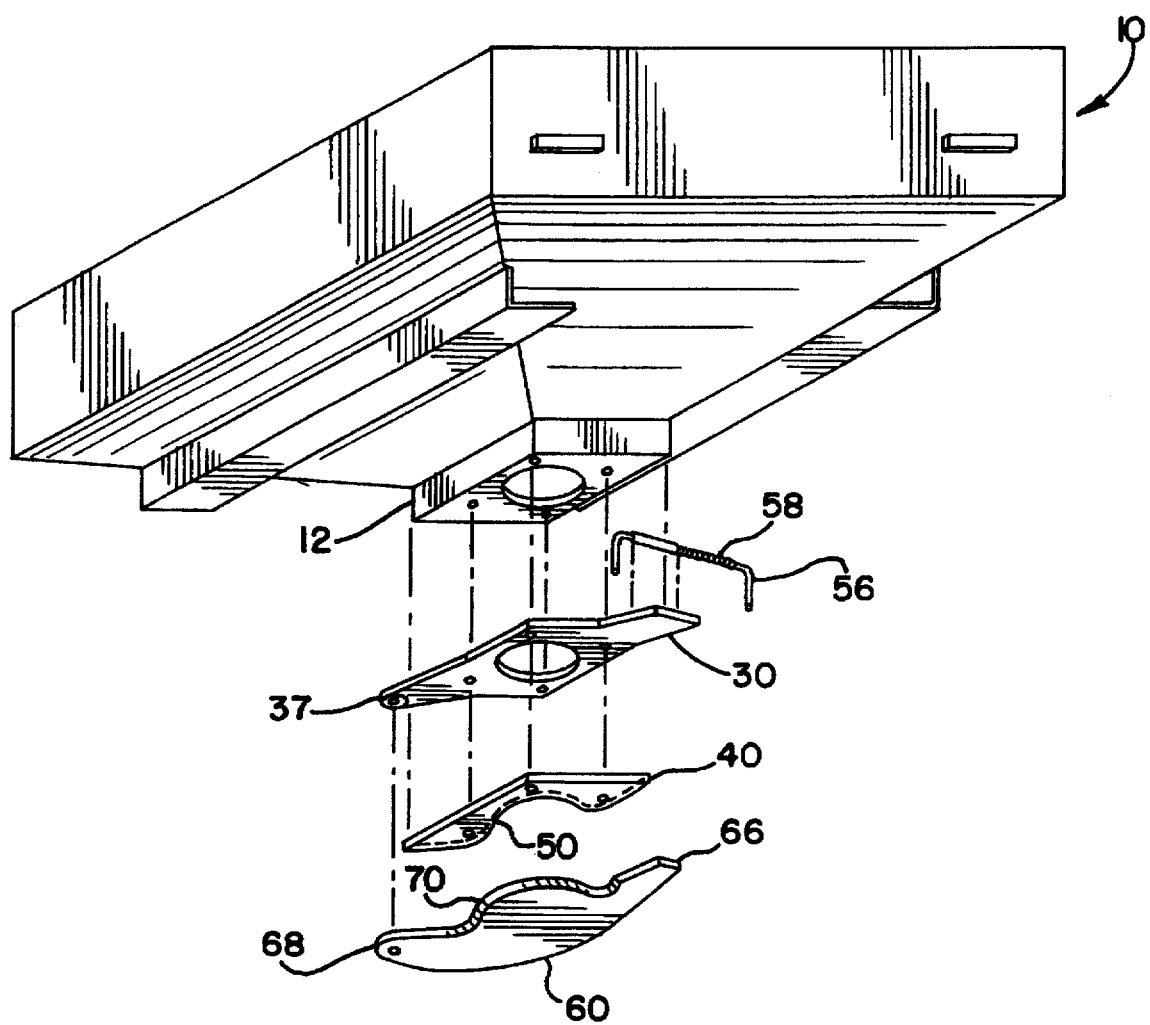

GATE VALVE FOR CONTROLLING THE FLOW OF VISCOUS LIQUIDS

BACKGROUND OF THE INVENTION

This invention relates to dump pots or transfer pots for carrying viscous materials. Particularly, this invention relates to drain valves on such transfer pots. More particularly, the invention relates to pivoting gate valves for use in controlling the flow of viscous materials from dump pots.

In the manufacture of many materials, viscous raw materials and intermediate products are commonly used or produced. For example, in the manufacture of chewing gum, a viscous gum base material is produced as an intermediate product. At a stage in the gum manufacturing process, the viscous gum base material is loaded into transport pots. The transport pots are used to carry the gum base material from one point to another point in the manufacturing process. The gum base material is typically made in a mixing kettle and then dumped into a transport pot. This pot is then transported by fork truck to processing machines. The transport pot has a valve at the bottom which is used to regulate the flow of material out of the transport pot. The valve is manually opened to transfer the gum base to processing machinery that will shape and form the gum base into pellets that are appropriate for the marketplace.

Typically, the transport pots are heated vessels, heated by such means as steam jacketing. The heat is required to maintain the transported material in a flowable state. Such highly viscous material as gum base may harden and become elastic as it cools, which is undesirable to occur in the transport pot. This is also a problem after transferring gum base from the transport pots to the processing machines, when the drain valves are manually closed. These conventional drain valves do not always close well and the gum base material drips from the valve and cools, thereby forming "strings" of gum base material that hang below the transport pots from the valves. These "strings" may drag on the factory floor and must be manually removed for sanitary reasons.

Many valves currently in use in such service at the drain of a transport pot are not well-suited for use with such viscous-heated materials. Some valves include a packing material that cannot withstand the high temperatures required to keep such viscous materials as thermoplastic adhesive or gum bases in a flowable form. Other valves have intricate shapes, pockets and crevices in which the viscous material may collect. It may be difficult to remove the viscous material from these hidden areas with the result that the material builds up and prevents the valves from operating properly.

Accordingly, there is a need for a drain valve for use on a transfer pot carrying hot viscous materials. Further, there is a need for such a drain valve that cleanly and securely closes against the viscous material and greatly reduces the formation of "strings".

SUMMARY OF THE INVENTION

The present invention provides for a transfer pot for carrying heated viscous materials. The transfer pot includes a material bin, a drain nozzle at the low point drain of the bin, a valve stop plate located at the drain nozzle outlet and a pivoting valve gate that has a sealing edge that contacts the stop plate where at the gate and the stop plate form a substantially flat contiguous surface.

In another embodiment of the invention, there is provided a pivoted gate valve that includes a seat plate with an orifice for the flow of viscous material therethrough, a stop plate mounted on the seat plate, and a valve gate pivotably mounted to the seat plate. The stop plate has a bottom surface and a seal edge, with the seal edge substantially aligned along a portion of the seat plate orifice. The valve gate includes a handle, a top surface, a bottom surface and a seal edge between the top and bottom surfaces. The valve gate seal edge has a shape that substantially corresponds to the stop plate seal edge. The valve gate top surface is substantially parallel and adjacent to the seal plate. When the valve is in a closed position, the valve gate bottom surface and the stop plate bottom surface form a substantially flush contiguous surface.

Preferably, the stop plate seal edge has a bevel such that the edge and the bottom surface of the stop plate form an acute angle. The valve gate seal edge also has a bevel that compliments the stop plate seal edge. The stop plate seal edge is beveled such that the edge forms an obtuse angle with the bottom surface of the valve gate. These angles are complementary, that is, one edge closely mates with the other such that when the valve is in a closed position, the edges cooperate to force the valve gate top surface against the seat plate, thereby forming a tight seal in the drain valve.

One advantage of this invention is that the flush contiguous surface that is formed allows for any "strings" to be easily removed and scraped away. Another advantage is that the complementary beveled edges of the stop plate and the valve gate act to slice through the viscous material and squeeze any viscous material out and away from the complementary seating surfaces thereby reducing the number of "strings" that result and clearing any viscous material away from the valve parts. Further advantages of this invention will be apparent and readily understood by one skilled in the art from the detailed description which follows.

BRIEF DESCRIPTION OF THE DRAWINGS

FIG. 5 is a bottom plan view of an alternative embodiment of a pivoting gate valve assembly in an open position.

FIG. 6 is a bottom plan view of an alternative embodiment of a pivoting gate valve assembly in a closed position.

FIG. 7 depicts a cross-sectional detail of the pivoting gate valve embodiment depicted in FIG. 6 taken along line 7—7.

FIG. 8 is an exploded perspective view of another embodiment of a transfer pot with a pivoting gate assembly.

DETAILED DESCRIPTION OF THE PREFERRED EMBODIMENT OF THE INVENTION

Figure 1:
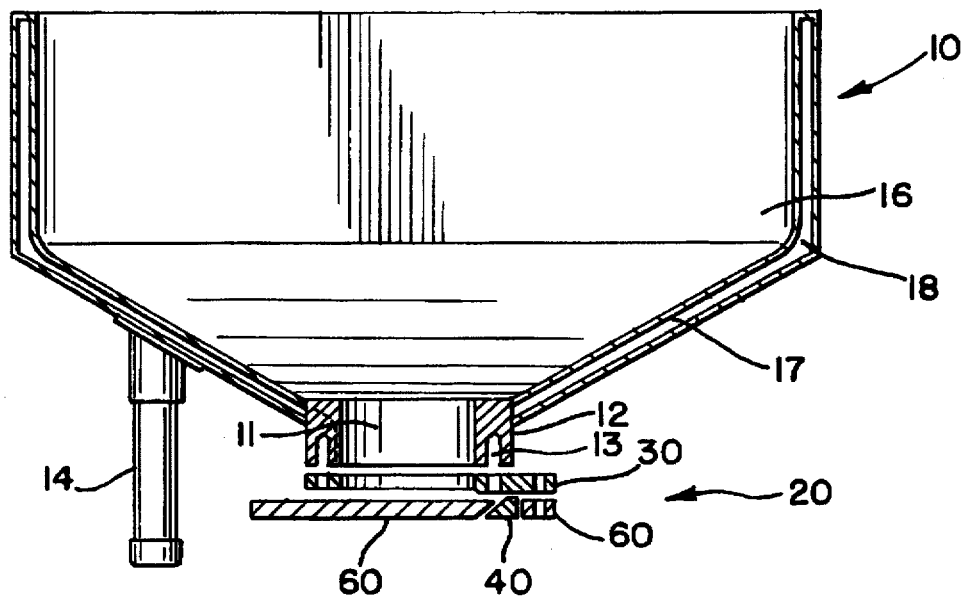
FIG. 1 is a cross-section of a transfer pot with the pivoting gate valve assembly at the bottom of the drain nozzle.
Figure 2:
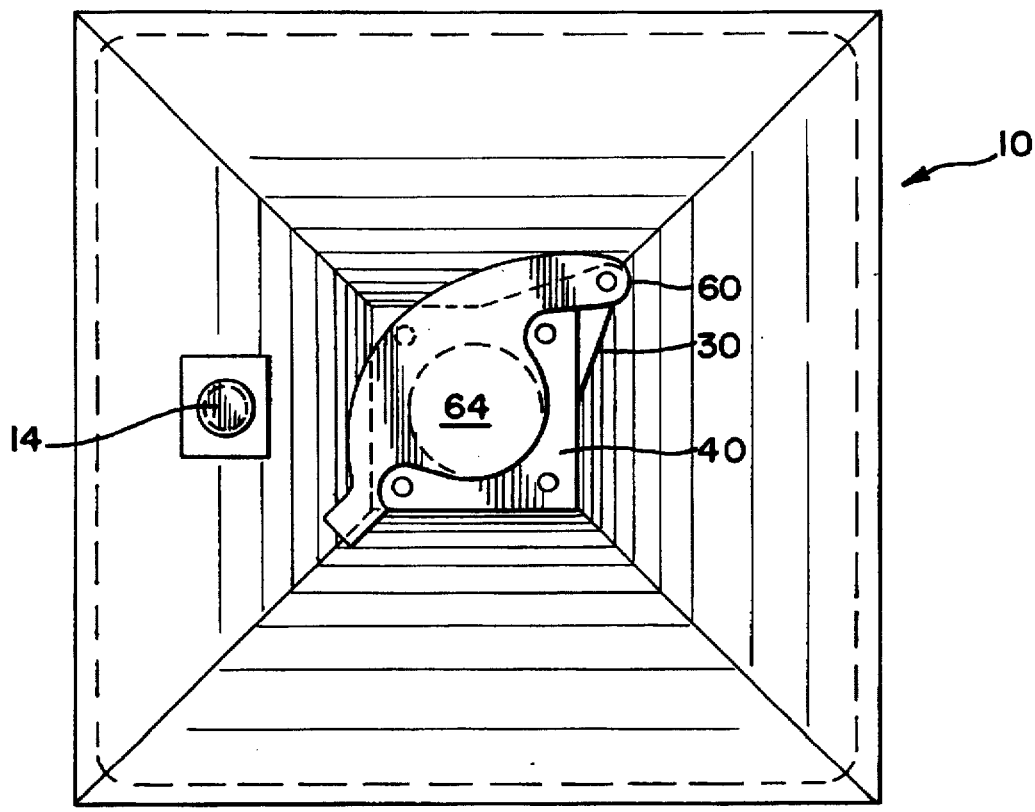
FIG. 2 is a bottom plan view of the transfer pot of FIG. 1 depicting an embodiment of the pivoting gate valve in a closed position.

In a preferred embodiment of the invention, as shown in FIGS. 1 and 2, a transfer pot has a pivoting gate valve assembly located at the drain nozzle outlet. The transfer pot 10 includes a material bin, a drain nozzle 12, a seat plate 30, a stop plate 40, and a valve gate 60.

The transfer pot 10 generally includes a material bin 16 that is typically an open vessel with a gradually sloping bottom 17. The bin has a doublewalled exterior 18 which my be useful as a steam jacket to apply steam as a source of heat for keeping the materials in the bin in a flowable viscous state. The transfer pot 10 includes a floor stop leg 14 that keeps the bin off the floor. A drain nozzle 12 is located at the bottom of the sloping sides 17. The drain nozzle has a number of threaded bolt holes 13 spaced equal distantly around the perimeter of the drain 11. The valve assembly 20 is mounted at the bottom of the drain nozzle 12. Threaded bolts may typically be used to hold the valve assembly 20 tightly against the drain nozzle.

Figure 3:
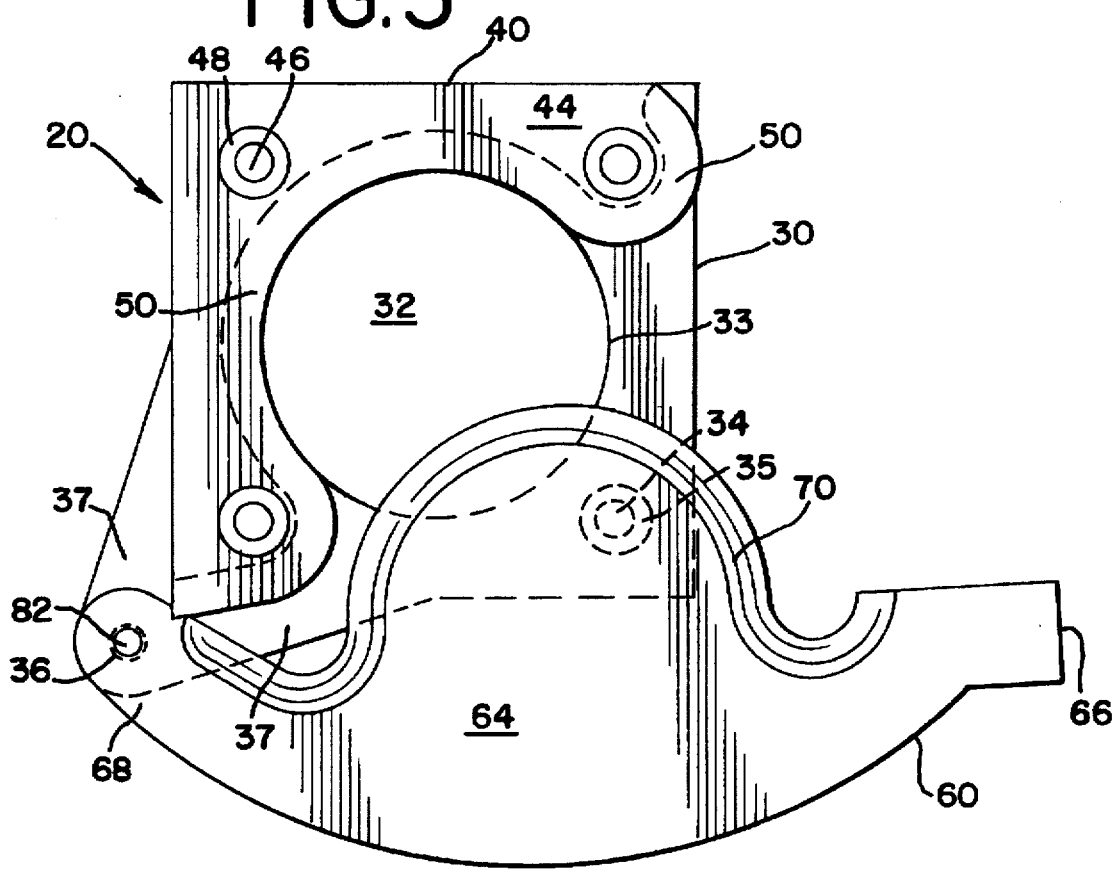
FIG. 3 is a bottom plan view of the pivoting gate valve from FIG. 2 except shown in an open position.

Referring how to FIG. 3, the valve assembly 20 is shown in an open position. The seat plate 30 is shown here as a generally square shape with an orifice 32 through the center. The shape of the seat plate and the orifice generally are determined by the shape and size of the drain nozzle 12. The seat plate 30 has a valve gate pivoting end 37 which is an extension of the seat plate beyond the edge of the drain nozzle 12 as may be readily seen in FIG. 1. This plate extension 37 is used to provide for a pivot mount for the valve gate 60 a distance away from the stop plate to ensure that the valve gate may move free and clear away from the stop plate 40 and the orifice 32. The seat plate includes 4 bolt holes 34 that align with the threaded bolt holes 13 in the drain nozzle 12. At one of the seat plate bolt holes there is a counterbore 35 provided so that a bolt, or fastener 80, may be countersunk below the seat plate surface so that the bolt does not protrude and does not interfere with the operation and pivoting action of the valve gate 60.

A stop plate 40 is mounted to the seat plate 30. As shown in FIG. 3, the seat plate 40 has an edge 50 that generally is aligned with a portion of the orifice parameter 33. Preferably, the stop plate edge follows the contour of the orifice 32 about one-half away around the parameter 33. The stop plate 40 has three bolt holes 46 with counterbores 48 at each bolt hole. The counterbores allow bolt heads to be countersunk below the bottom surface 44 of the stop plate. The top surface 42 is located adjacent to the seat plate 30 as may be readily seen in FIG. 7. As seen in FIG. 3, the seal edge 50 of the stop plate 40 follows along the entire side of the stop plate that would be in contact with the valve gate 60. Thus, the edge 50 follows around the contours of the bolt holes at the far end of the stop plate.

Again, referring to FIG. 7, the stop plate edge 50 is beveled at an angle to form an acute angle 52 with the top surface 44. Correspondingly, the seal edge 50 forms an obtuse angle 54 with the bottom surface of the stop plate 42. Preferably, the acute angle 52 is formed between 30° and 60°. Correspondingly, the obtuse angle is preferably between about 120° and 150°. Thereby, the stop plate edge 50 cooperates with the seal plate 30 to form a receiving wedge for the stop plate edge 70.

Referring now again to FIG. 3, the valve gate 60 is shown in an open position. The valve gate 60 has a handle 66, a bottom surface 64, a top surface 62, as shown in FIG. 7, and a pivoting end 68. The pivoting end 68 is pivotably mounted to the seat plate pivoting end extension 37. A pin 82 is inserted through the pivot bore 36 to pivotably mount the valve gate to the stop plate 30. The top surface 62 is substantially parallel and adjacent to the stop plate 30. The valve gate has a size sufficiently large enough to cover the orifice 32 in the stop plate. The valve gate has a seal edge 70 that runs along the side of the valve gate proximate to the stop plate. The seal edge 70 has a shape that generally corresponds to the shape of the seal edge 50. As can be seen in FIG. 7, the seal edge 70 forms an obtuse angle 74 with the top surface 64. The seal edge 70 forms an acute angle 72 with the top surface 62. Preferably, this acute is between 60° and 30°. Preferably, the obtuse angle is between 120° and about 150°.

Preferably, the edge 70 is beveled at a degree that corresponds complementarily with the beveled edge 50 in the stop plate. In this manner, the valve gate edge 70 will precisely mate with the stop plate edge 50.

As shown in FIG. 7, the seat plate 30 has a groove 38 located near the orifice perimeter 33. Likewise, the drain nozzle 12 has a groove 26 located near the perimeter 33. The grooves 26 and 38 substantially align to form an O-ring gasket groove wherein an O-ring 28 may be placed. The O-ring provides a tight seal between the seat plate 30 and the drain nozzle 12. Likewise, the O-ring also permits the seat plate 30 and the drain nozzle 12 to come in direct contact with one another in order to provide for maximum heat transfer from the drain nozzle 12 to the seat plate 30. It is contemplated that a similar O-ring groove and O-ring may be placed in the stop plate and the seat plate in order to provide for a tight seal between the stop plate 40 and the seat plate 30. A bolt 80 is shown threaded into the drain nozzle bolt hole 13. The bolt head is countersunk into the stop plate counterbore 48. This provides for a substantially flat bottom surface 44 in the stop plate.

Figure 4:
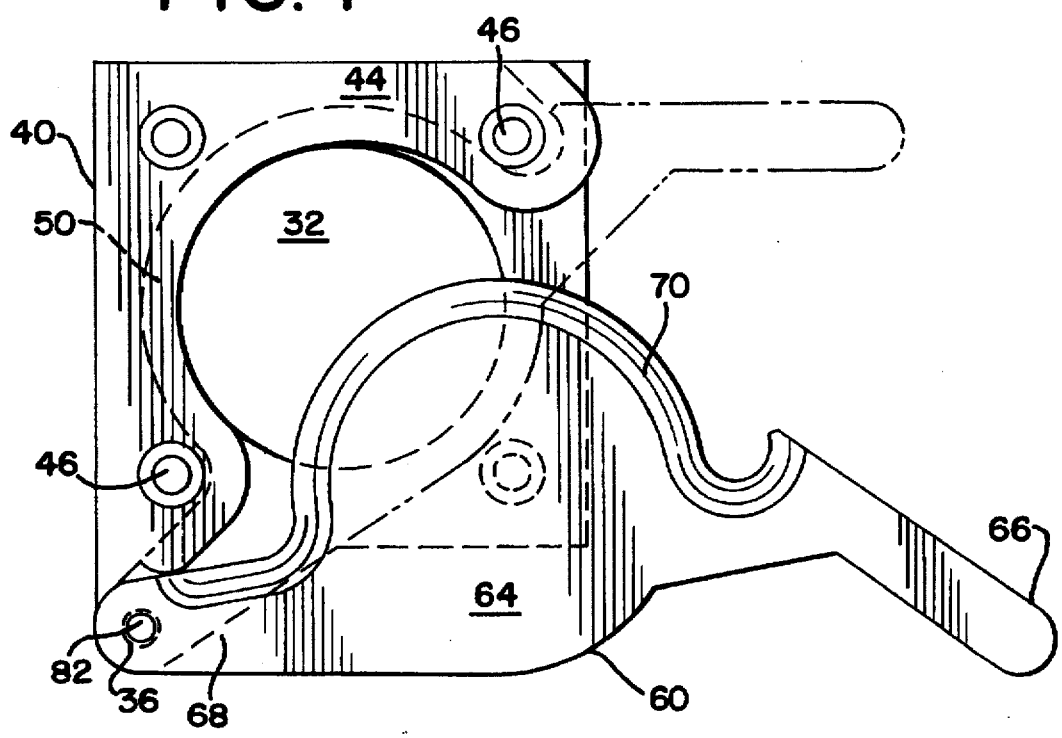
FIG. 4 is a bottom plan view of an alternative embodiment of a pivoting gate valve assembly.

FIGS. 4, 5 and 6 depict an alternative embodiment of the present invention. In this embodiment, the valve gate 60 is pivotably mounted at a point that is offset from the diametrically opposed bolt holes 46 in the stop plate 40. In the previously described embodiment, the pivot point 36, as seen in FIG. 3, was substantially aligned with the two diametrically opposed bolt holes at the end of the stop plate 40. In comparison, in FIG. 4, the pivot point 36 is offset from alignment with the two diametrically opposed bolt holes 46 and the stop plate 40.

Likewise, the handle 66 is substantially offset from alignment with the two diametrically opposed bolt holes 46. The precise location and the configuration of the handle 66 may take any number of forms. One skilled in the art may readily design a handle best suited for their application depending on the torque and leverage requirements. Likewise, the location of the pivoting point 36 of the valve gate may be readily selected depending on the desired torque, leverage, space and other requirements for the intended service. Other factors may affect the design decisions, such as the materials of construction and whether the valve is to be manually operated or whether a motor or piston operator is to be used.

When the valve is to be manually operated, it may be designed to include a latching mechanism 56 on the valve assembly 20, as shown in FIG. 8. This latch 56 be readily attached to the seat plate 30 near the end of the seat plate proximate to the location of the valve gate handle 66 when the valve gate 60 is in a closed position. Preferably, the latch 56 has a spring 58 such that the latch incorporates a spring force imparted against the handle to bias the valve gate edge 70 tightly against the stop plate edge 50. When the valve gate edge 70 and the stop plate edge 50 have complementary bevels, the spring bias of the latch will also force the valve gate 60 more tightly against the seat plate 30. One skilled in the art may readily adapt other configurations of latches and clips that are within the contemplated scope of the invention.

The operation of the pivoting gate valve should be apparent from the sequence of FIGS. 5 and 6. FIG. 5 depicts the valve gate in a partially opened position. Part of the valve gate is still blocking a portion of the orifice 32. In FIG. 6, the valve gate is pivoted into a closed position. As may be seen, the valve gate edge 70 is against the stop plate edge 50. In greater detail this may be seen in FIG. 7. As the valve gate edge 70 upon closing approaches the stop plate edge 50, the two edges come into sliding contact. The complementary angles of the corresponding edges force the valve gate 60 to slide against the stop plate 40 and come closer and against the seat plate 30. As well, the acute angle formed by the valve gate edge 70 and the valve gate top surface 62 forms the acute angle 72 which may be thought of as a knife edge which can be useful for scraping away any viscous material that may adhere to the stop plate 30. Thus, the knife edge 72 may be also useful to cut away any "strings" that may be adhering to the seat plate 30. In addition, the relative angles of the beveled edges of the stop plate and the valve gate may also squeeze any viscous material out from between the two surfaces as the valve gate is closed. Thus, the valve gate maintains a clean surface against the seat plate 30 and against the stop plate 50.

Preferably, when the valve gate 60 is in a closed position, the bottom surface 64 and the bottom surface 44 of the stop plate form a substantially flush contiguous surface as may be readily seen in FIG. 7. This offers the advantage of being able to easily scrape away any viscous material which may subsequently be hanging from the valve assembly after the valve is closed.

Those skilled in the art to which the invention pertains may make modifications and other embodiments employing the principals of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

We claim:

1. A pivoting gate valve comprising:

a seat plate having an orifice therethrough;

a stop plate mounted on the seat plate, the stop plate having a bottom surface, a top surface and a seal edge that is substantially aligned with a portion of the seat plate orifice, the seal edge having a bevel; and a valve gate pivotably mounted to said seat plate, said valve gate having a distal handle, a top surface, a bottom surface, and a seal edge between the top surface and bottom surface, the seal edge has a shape that substantially corresponds to the seal edge of the stop plate with the valve gate seal edge having a bevel that complements the stop plate seal edge so as to mate therewith when the valve is in a closed position, the top surface is substantially parallel and adjacent to the seat plate, the bottom surface of the valve gate and the bottom surface of the stop plate form a substantially flush contiguous surface when the valve is in a closed position.

2. The gate valve of claim 1 wherein:

the stop plate top surface is adjacent to the base plate, and the seal edge is bevelled such that the edge forms an acute angle with the bottom surface and forms an obtuse angle with the top surface; and the gate seal edge has a bevel that forms an obtuse angle with the bottom surface and forms an acute angle with the top surface, such that when the valve is in a closed position, the gate seal edge contacts the stop plate seal edge and the edges cooperate to force the gate top surface against the seat plate.

3. The gate valve of claim 2 wherein:

the stop plate acute angle is between about 30 and about 60 degrees; and the valve gate acute angle is between about 30 and about 60 degrees.

4. The gate valve of claim 1 wherein:

the valve gate handle extends away from the gate at an end distal from a pivotably mounted end.

5. The gate valve of claim 4 wherein:

the seat plate further includes a handle latch positioned at an end of the seat plate proximate to the gate handle when the valve is in a closed position.

6. The gate valve of claim 5 wherein:

the handle latch is spring biased to bias the valve gate against the stop plate when the latch engages the handle.

7. The gate valve of claim 1 wherein:

the seat plate has two bolt holes and a gate mounting bore, the bolt holes are diametrically opposed on opposite sides of the orifice, the bolt holes define a bolt circle concentric with the orifice, the gate mounting bore is positioned outside the bolt circle and proximate to one of the bolt holes;

the stop plate has two bolt holes that align with the seat plate bolt holes;

a fastener in each of the bolt holes fixes the stop plate to the seat plate; and a pin in the bore pivotably mounts the valve gate to the seat plate.

8. The gate valve of claim 7 wherein the gate mounting bore is aligned with the two bolt holes.

9. The gate valve of claim 7 wherein:

the stop plate has a counterbore in the bottom surface at each bolt hole to permit the fastener to be countersunk below the bottom surface thereby avoiding protrusions extending beyond the substantially flat surface formed when the valve is in a closed position.

10. The gate valve of claim 1 wherein the seat plate has an circular groove around the orifice adapted to receive an O-ring gasket.

* * * * *